Sept. 29, 1931.  E. LATSHAW  1,825,530
MOUNTING FOR CAR AXLES
Filed March 2, 1931  2 Sheets-Sheet 1
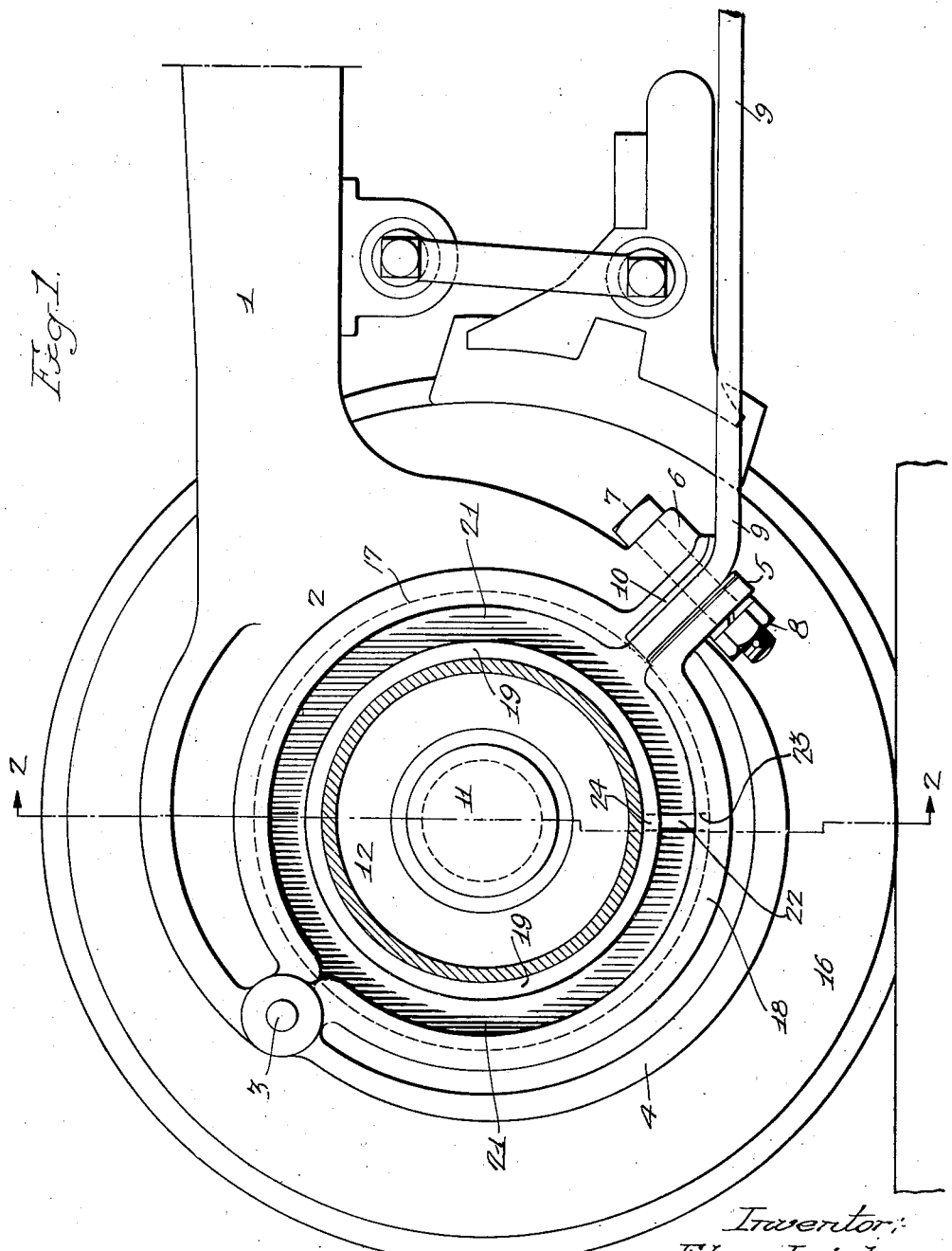

Sept. 29, 1931.  E. LATSHAW  1,825,530
MOUNTING FOR CAR AXLES
Filed March 2, 1931   2 Sheets-Sheet 2
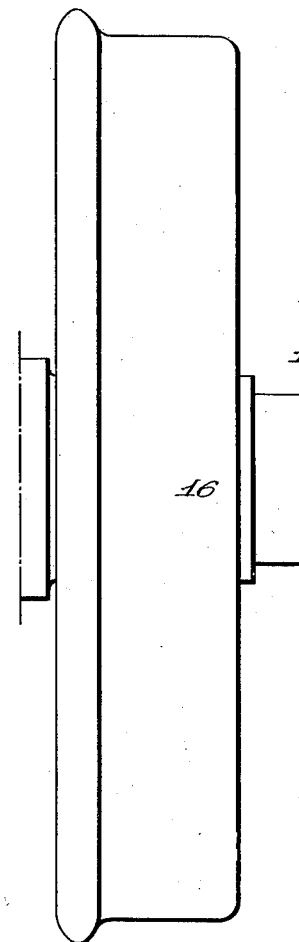
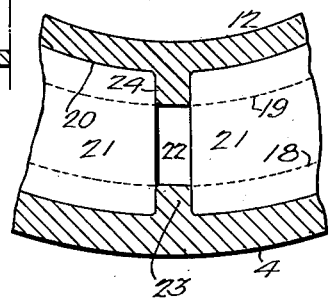
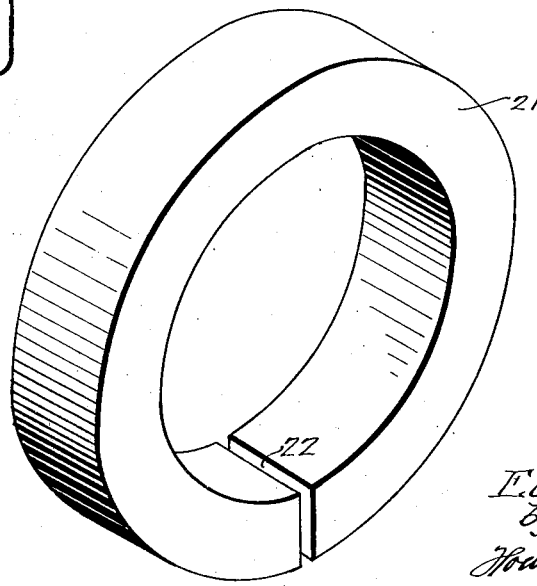
Inventor
Elmer Latshaw
by his Attorneys
Howson & Howson Patented Sept. 29, 1931

1,825,530

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

MOUNTING FOR CAR AXLES

Application filed March 2, 1931. Serial No. 519,541.

The object of my invention is to mount an axle box within a cushion of rubber or other resilient material.

A further object of the invention is to provide a cushion between the axle box and the frame, which will absorb shocks and which will prevent the transmission of vibrations and metallic sounds from the wheels to the truck frame and car body.

A still further object of the invention is to mount the journal box so that there is a full universal action of the journal box with respect to the yoke. This is permitted by the use of a ring of rubber or other resilient material mounted between the axle box and the frame.

In the accompanying drawings:

Fig. 1 is a side view of one end of a car truck, illustrating my invention;

Fig. 2 is a sectional view on the line 2—2, Fig. 1;

Fig. 3 is a detached perspective view of the ring of resilient material, in the present instance, rubber; and Fig. 4 is a sectional view on the line 4—4, Fig. 2.

1 is the frame of the car truck, having a segmental end bearing 2 and pivoted at 3 to the outer end of the frame is a segmental clamp member 4, which is secured to the segmental end of the frame. The clamp member has a lug 5 and the frame has a lug 6. Extending through the two lugs is a bolt 7, on which is a washer and a nut 8.

In the present instance there is a tie bar 9, which extends from one end of the truck to the other end thereof, and this tie bar is bent upwards and is located between the lug on the frame 1 of the truck and the lug 5 on the clamp member, and this bar is preferably welded to the truck frame as at 10. 11 is one of the axles of the truck and 12 is the journal box. In the present instance, located within the journal box is a bearing 13 for the axle. The inner end of the journal box is grooved as at 14, and located in the groove is a dust guard 15. 16 is the wheel of the car truck. While one form of journal box is shown, it will be understood that different types of journal boxes may be used without departing from the essential features of the invention.

The segmental end 2 of the body of the truck has an internal groove 17, and the segmental clamp member 4 has a like groove 18. On the journal box are formed two annular ribs 19 and these ribs are spaced apart so as to form a groove 20. 21 is a ring of resilient material, which in the present instance is rubber and is rectangular in cross section. The periphery of this ring extends into the grooves 17 and 18 of the truck frame 1 and segmental member 4, while the inner portion is located in the groove of the journal box, so that the box is entirely surrounded by the resilient rubber ring. The grooves are of such depth that the ring will be held in place between the journal box and the frame. In the present instance the ring is split at 22 and the ends abut against ribs 23 and 24 on the clamping member 4 and the journal box respectively, preventing the ring turning in the grooves. Shims 25 are located between the lug 5 of the clamping member and the tie bar to allow the parts to be adjusted for wear.

By the above description it will be seen that the vertical or car body load is cushioned between the journal box and the side frame by the rubber ring, which absorbs shocks and prevents the transmission of vibration and metallic sounds from the wheels to the truck frame and car body. The fact that the rubber will sufficiently cushion the load with a very small amount of deflection, means that the brake shoe position on the wheels will vary slightly with that of the passenger load. When the motors are driven in either direction, the horizontal force is transmitted from the journal box from the frame through the rubber cushion. Thus the rubber eliminates the usual noises occurring when a journal box is forced against the pedestals in the conventional design. The lateral force originating at the wheel flanges when the car is rounding a curve, is insulated with respect to the truck frame by means of the rubber ring. The ring being held in position under compression, creates an excellent tie between the two yokes, eliminating the necessity of an end cross member. Mounting the journal boxes in the manner described, permits a full universal action of the journal box with respect to the yoke, which action is permitted by the yield in the rubber ring. This allows the use of any type of anti-friction bearing.

In the drawings I have shown a solid ring of rubber located between the journal box and the bearing but it will be understood that in some instances the ring may be tubular so that the ring may be inflated without departing from the essential features of the invention.

I claim:

1. The combination in a car truck, of a frame having a segmental end bearing; a segmental clamp member pivoted to the said end bearing; means for securing the two parts together; a cylindrical journal box; and a ring of resilient material located between the bearing, the segmental member and the cylindrical journal box.

2. The combination in a car truck, of a frame having a segmental bearing; a segmental clamp member pivotally connected to said bearing, and means for securing the two parts together, each part having an interior groove therein; a cylindrical journal box having an external groove; and a resilient ring surrounding the journal box and extending into the grooves of the journal box and the bearing and segmental clamp member.

3. The combination in a car truck, of a frame having a segmental end bearing; a segmental clamp member; a pivot pin pivotally connected to the segmental end bearing, the end bearing and the segmental clamp member having lugs and a bolt extending through the lugs, securing the two parts together, each part having an internal groove therein; a cylindrical journal box having an external groove; and a resilient ring mounted between the journal box, the bearing and the segmental clamp member, the ring extending into the groove in the journal box and the groove in said members.

4. The combination in a car truck, of a frame having a segmental end bearing; a segmental clamp member pivoted to the end and a tie-rod located between the free ends of the two parts and secured to the frame at the bearing; means for securing the segmental clamp member to the end bearing; a cylindrical journal box; and a ring of resilient material located between the journal box and the bearing and segmental clamp member.

5. The combination in a car truck, of a frame having a segmental end bearing; a segmental clamp member pivoted to the segmental bearing, each part having a lug opposite the pivot; a tie-rod extending between the two lugs and welded to the lug of the segmental bearing; a bolt extending through the two lugs and the end of the rod; a cylindrical journal box; and a ring of resilient material between the journal box and the bearing and the segmental clamp member.

6. The combination in a car truck frame, of a journal box located in the frame; and a split ring of rubber located between the journal box and the frame, the box and the frame each having a lug extending into the space between the end of the split ring to prevent the ring turning.

ELMER LATSHAW.